3,485,921
ANALGESIC AND ANTITUSSIVE METHODS AND COMPOSITIONS EMPLOYING TRANS - (L)-3-(o-CHLOROPHENYL) - 1,6-DIMETHYL-5-PHENYL-1,4,5,6-TETRAHYDRO-as-TRIAZINE
Allen D. Rudzik, Kalamazoo, Mich., assignor to The Dow Chemical Company, Midland, Mich., a corporation of Delaware
No Drawing. Filed Aug. 7, 1967, Ser. No. 658,599
Int. Cl. A61k 27/00; C07d 55/14
U.S. Cl. 424—249                 8 Claims

ABSTRACT OF THE DISCLOSURE

This invention relates to a method of alleviating symptoms of pain and tussive symptoms in animals by administering to animals an analgesic or an antitussive amount of the trans-levorotary isomer of 3-(o-chlorophenyl) - 1,6 - dimethyl - 5 - phenyl - 1,4,5,6 - tetrahydro-as-triazine.

BACKGROUND OF THE INVENTION

The compound employed in the method of the invention is described by Trepanier et al. in Abstracts of Papers Presented at 152nd Meeting, ACS, Division of Medicinal Chemistry, New York, Sept. 12–15, 1966, Abstract No. 6 and J. Med. Chem. 9, 881 (1966).

SUMMARY OF THE INVENTION

This invention is directed to a method which comprises administering an antitussive or an analgesic amount of trans(L) - 3 - (o - chlorophenyl) - 1,6 - dimethyl - 5-phenyl - 1,4,5,6 - tetrahydro - as - triazine and its pharmacologically-acceptable salts or a composition containing such substituted triazine as the active ingredient therein to animals. The method and composition of the invention are particularly useful when the animal is suffering symptoms of pain or tussive symptoms, or both.

It has been found that trans(L) - 3 - (o - chlorophenyl) - 1,6 - dimethyl - 5 - phenyl - 1,4,5,6 - tetrahydro-as-triazine and its pharmacologically-acceptable salts have useful analgesic and antitussive properties. For the purpose of brevity, trans(L)-3-(o-chlorophenyl)-1,6-dimethyl - 5 - phenyl - 1,4,5,6 - tetrahydro - as - triazine will be hereinafter referred to as the triazine compound. The triazine compound is particularly useful for alleviating symptoms of pain or tussis in mammals. It does not produce effects such as "Hermann-Straub tail" or stereotypy in mice at dosages consistent with good analgesic and antitussive activity. It has an $LD_{50}$ in rats of about 540 milligrams per kilogram by subcutaneous injection. The triazine compound is a crystalline solid which is soluble in a variety of organic solvents such as ether, benzene, chloroform or methylene chloride. The pharmacologically-acceptable salts are crystalline solids which are of varying degrees of solubility in organic solvents and of moderate solubility in water.

As employed herein, the phrase "pharmacologically-acceptable salt" refers to acid addition salts of the triazine compound, the anions of which are relatively non-toxic and innocuous to animals at dosages consistent with good analgesic and antitussive activity so that side effects ascribable to the anions do not vitiate the beneficial effects of the free triazine compound. Suitable pharmacologically-acceptable salts which can be employed in the methods and composition of the invention include those derived from mineral acids such as the hydrochloride, hydrobromide, phosphate, nitrate and sulfate salts, those derived from organic carboxylic acids such as the succinate, citrate, malate and acetate salts and those derived from organic sulfonic acids such as the methanesulfonate and toluenesulfonate salts.

The active triazine compound is preferably employed in the form of a pharmacologically-acceptable salt and the preferred compound is the hydrochloride salt. The hydrochloride salt is a crystalline solid melting at 256°–257° C. and having a specific optical rotation $[\alpha]_D^{25}$ of $-132.7°$ for a solution of 4 grams of the salt in 100 milliliters of methanol. The triazine compound can be prepared by the sulfuric acid catalyzed condensation of N-amino(L)ephedrine with o-chlorobenzonitrile as described by Trepanier et al., J. Med. Chem. 9, 881 (1966).

In accordance with the invention, an analgesic or antitussive amount of the triazine compound or a pharmacologically-acceptable salt thereof is administered to an animal. In the preferred procedure, an analgesic or antitussive amount of the active triazine compound or a composition containing the same is administered to a mammal suffering from one or both of symptoms of pain or tussive symptoms. The exact amount of the compound to be administered depends on various factors such as the size, type and age of the animal to be treated, the severity of the symptoms or whether or not the animal is suffering from one or both of such symptoms provided, however, that the animal is administered sufficient of the active compound to substantially alleviate the particular symptom or combination of symptoms.

Generally, the compound is administered at dosage rates from 25 milligrams per kilogram to 200 miligrams per kilogram of animal body weight to alleviate symptoms of pain. When administered by subcutaneous injection, an analgesic amount will generally be from about 25 to 100 milligrams per kilogram and from 50 to 200 milligrams per kilogram when administered orally. An antitussive amount will generally be from about 25 to about 100 milligrams per kilogram. To alleviate pain or coughing, it is generally preferred to administer the triazine compound or a pharmacologically-acceptable salt thereof in the form of a dosage unit containing from about 50 to about 200 milligrams or more of the active ingredient per unit. Dosage units adaptable to oral administration such as tablets, capsules, elixirs, syrups and the like are preferred and the active triazine compound can be formulated in conventional time release capsule or tablet formulations, in which case the preferred dosage per unit can be as high as 150 milligrams to 300 milligrams or more per unit.

In practicing the method of the invention, the active ingredient is preferably incorporated in a composition comprising a non-toxic carrier and an analgesic or antitussive amount of the triazine compound or a pharmacologically-acceptable salt thereof. The term "non-toxic carrier" refers to known excipients which are substantially non-toxic and non-sensitizing. The compositions can be prepared by known techniques for the preparation of tablets, capsules, elixirs, syrups, emulsions, dispersions, wettable and effervescent powders and sterile injectable compositions and can contain suitable excipients known to be useful in the preparation of the particular type of composition desired. The compositions are then administered to animals and in particular to mammals suffering symptoms of pain or tussive symptoms, or both, in an amount sufficient to constitute dosage with an analgesic or antitussive amount of the active triazine compound.

Suitable non-toxic carriers which can be employed in formulating solid compositions include lactose, glucose, gelatin, rice flour, starch, malt, magnesium carbonate, magnesium stearate and the like and compatible mixtures thereof. Liquid non-toxic carriers which can be employed in preparing liquid compositions include ethanol, propylene glycol, water, glycerine, normal saline, glucose syrup, syrup of acacia, mucilage of tragacanth and the like and compatible mixtures thereof. Oil-in-water and water-in-oil emulsions can be prepared with edible oils such as peanut oil, wheat germ oil, corn oil, arachis oil, olive oil or the like and with the aid of emulsifying agents such as lecithin, sorbitan trioleate, polyoxyethylene sorbitan monooleate, gum acacia and the like. Suspensions can be prepared with the aid of suspending agents such as methyl cellulose, carboxymethyl cellulose, hydroxypropylmethyl cellulose and polyethyleneoxide condensation products with alkylphenols, fatty acids or fatty alcohols and the like and compatible mixtures thereof. The preferred compositions contain either a suspending agent or an emulsifying agent, or both. The compositions can also contain sweetening agents such as sugar or calcium cyclamate, flavoring agents such as licorice, coloring materials such as caramel, preservatives and the like. The active ingredient can also be incorporated in sterile injectable compositions for intraperitoneal or subcutaneous injection. Such compositions are preferably prepared with a non-toxic carrier such as water or normal saline and the sterile injectable suspensions can also include suspending agents such as those listed above.

DESCRIPTION OF PREFERRED EMBODIMENTS

The following examples illustrate the invention but are not to be construed as limiting the same.

Example 1

Sterile injectable compositions comprising trans(L)-3-(o-chlorophenyl)-1,6-dimethyl-5-phenyl - 1,4,5,6 - tetrahydro-as-triazine hydrochloride in a 5 percent aqueous methyl cellulose suspension were prepared and administered to groups of ten male mice. The compound was administered at various dosage rates by subcutaneous injection. The mice were subsequently challenged by the intraperitoneal injection of aqueous 0.1 percent hydrochloric acid at a dosage rate of 0.01 milliliter per gram thirty minutes after the administration of the test compound. The mice were then placed in clear plastic cages and observed. In mice not treated with an analgesic, the intraperitoneal injection of this dosage of hydrochloric acid is followed by characteristic writhing of the mice, that is, flattening of the abdomen against the floor of the cage accompanied by rotation of the spine and pelvis. The dosage of trans(L) - 3 - (o - chlorophenyl) - 1,6 - dimethyl-5-phenyl-1,4,5,6-tetrahydro-as-triazine hydrochloride effective to prevent writhing or other symptoms of pain in 50 percent of the mice (ED 50) was calculated and found to be 26.5 milligrams per kilogram.

Example 2

The procedure of Example 1 was repeated using one group of four mice. The mice were administered trans(L)-3-(o-chlorophenyl)-1,6-dimethyl-5-phenyl - 1,4,5,6 - tetrahydro-as-triazine hydrochloride at a dosage rate of 50 milligrams per kilogram. A second group of mice was similarly treated by the subcutaneous injection of trans-(D)-3-(o-chlorophenyl)-1,6-dimethyl - 5 - phenyl-1,4,5,6-tetrahydro-as-triazine hydrochloride at a dosage rate of 50 milligrams per kilogram. Thirty minutes after the pretreatment with the test compounds, the mice were challenged by the intraperitoneal injection of aqueous 0.1 percent hydrochloric acid at a dosage rate of 0.01 milliliter per gram and observed for the characteristic writhing as described above in Example 1. The mice administered 50 milligrams per kilogram of trans(L)-3-(o-chlorophenyl) - 1,6 - dimethyl - 5 - phenyl-1,4,5,6-tetrahydro-astriazine hydrochloride were protected from writhing and were observed to exhibit no symptoms of pain. By way of contrast, three of the four mice pretreated with 50 milligrams per kilogram of trans(D)-3-(o-chlorophenyl)-1,6-dimethyl-5-phenyl-1,4,5,6-tetrahydro-as-triazine hydrochloride exhibited the characteristic writhing motions.

Example 3

Groups of ten male albino mice were examined for reaction time in a modified hot plate test. These examinations were carried out by placing a mouse on the surface of a 250 watt infra-red heat lamp and recording the time elapsed before the mouse jumped off the heat lamp surface. Each mouse was then returned to the top of the lamp as rapidly as possible and the reaction time recorded again for a total of four such determinations for each mouse. One group of mice was administered trans(L)-3-(o-chlorophenyl) - 1,6 - dimethyl-5-phenyl-1,4,5,6-tetrahydro-as-triazine hydrochloride at a dosage rate of 50 milligrams per kilogram by subcutaneous injection. The second group of mice was similarly administered the test compound at a dosage rate of 100 milligrams per kilogram. A third group of mice was not administered any triazine compound to serve as a check. Thirty minutes and sixty minutes after the injection, the reaction time of the treated mice and the check mice was determined. The average reaction times (time elapsed before a mouse spontaneously jumped off the heat lamp) for the check mice and for the mice treated at each dosage level are set out in the following table. The initial average reaction times for the two groups of mice administered the test compound are set out in the following table in the column denominated "Predrug Control."

TABLE I

| Subcutaneous Dosage (Milligrams/Kilogram) | Predrug control | Average reaction time in seconds | | | |
|---|---|---|---|---|---|
| | | 30 minutes | | 60 minutes | |
| | | Control | Test compound | Control | Test compound |
| 50 | 7.8 | 8.1 | 16.7 | 7.4 | 14.7 |
| 100 | 7.3 | 7.3 | 23.0 | 7.8 | 21.3 |

Example 4

Three groups, A, B and C, of male and female guinea pigs weighing from 350 to 400 grams were administered trans(L) - 3 - (o-chlorophenyl) - 1,6 - dimethyl-5-phenyl-1,4,5,6-tetrahydro-as-triazine hydrochloride orally. Group A was administered the compound at a dosage rate of 25 milligrams per kilogram, Group B at a dosage rate of 50 milligrams per kilogram and Group C at a dosage rate of 75 milligrams per kilogram. The animals in each group were exposed to ammonia vapor for a two-minute period and the animals were held for ten minutes following exposure to ammonia vapor. During the ten-minute period, the number of times each animal coughed was counted. Three similar groups of guinea pigs, A', B' and C', were similarly prepared and similarly tested to serve as controls. These control groups were not administered any of the active triazine compound. The average number of coughs during the ten-minute period was calculated for each group. The dosage of the test compound and the average number of coughs are set out for Groups A, B and C in Table II and the average number of coughs for the control groups are set out in Table III. III.

TABLE II

| Test | Oral dose (milligrams/kilogram) | Number of animals | Average number of coughs |
|---|---|---|---|
| A | 25 | 5 | 18.8 |
| B | 50 | 10 | 17.8 |
| C | 75 | 10 | 15.8 |

TABLE III

| Test | Number of animals in control group | Average number of coughs |
|---|---|---|
| A' | 5 | 23.2 |
| B' | 10 | 23 |
| C' | 10 | 26.4 |

These data indicate that oral dosage of 25 to 50 milligrams per kilogram of the test compound produces approximately a 20 percent reduction in coughing rate and the 75 milligram per kilogram oral dosage produces a 30 percent reduction in the cough rate.

Example 5

A cat was anesthetized by the intraperitoneal injection of 40 milligrams per kilogram of pentobarbital and the cough response was elicited by electrical stimulation of the superior laryngeal nerve by the method of Domenjoz [Arch. Expt. Pathol. Pharmakol. 215, 19 (1952)]. 0.5 to 1 volt electrical stimulations were made every minute for 3 to 5 seconds. Within two or three minutes after electrical stimulation was begun, trans(L)-3-(o-chlorophenyl) - 1,6 - dimethyl-5-phenyl-1,4,5,6-tetrahydro-as-triazine hydrochloride was administered to the cat at a dosage rate of 2 milligrams per kilogram by intravenous injection. Substantially complete inhibition of the cough response was observed during a period of about 5 minutes following the administration of the test compound. The test procedure was repeated on a second cat with similar results.

Example 6

The procedure of Example 5 was repeated with the sole variation being the administration of trans(L)-3-(o-chlorophenyl)-1,6-dimethyl - 5 - phenyl-1,4,5,6-tetrahydro-as-triazine hydrochloride at a dosage rate of 3 milligrams per kilogram by intravenous injection. Substantially complete inhibition of the cough response was observed throughout a period of about ten minutes immediately following the injection of the test compound.

Example 7

1.2 parts of trans(L)-3-(o-chlorophenyl)-1,6-dimethyl-5-phenyl-1,4,5,6-tetrahydro-as-triazine hydrochloride are mixed with 15 parts of ethanol. The mixture is added with stirring to a mixture of 0.5 part of methyl cellulose, 35 parts of sucrose and 0.001 part of edible dyestuff in 100 parts of water. A suitable flavoring agent is then added and the mixture is filled into glass bottles and sterilized. The composition is administered orally in dosages of 0.25 or 0.5 fluid ounce.

Example 8

To a mixture of 1.7 parts of trans(L)-3-(o-chlorophenyl) - 1,6-dimethyl-5-phenyl - 1,4,5,6-tetrahydro-as-triazine and 33.7 parts of liquid paraffin are added 3 parts of gum acacia and 1.5 parts of gum tragacanth. The mixture is thoroughly triturated and is added slowly with stirring to a solution of 0.1 part of a cetyl alcohol polyoxyethylene condensate, 40 parts of cane sugar, 0.3 part of methyl p-hydroxybenzoate and 0.002 part of edible dyestuff in 110 parts of water. A suitable flavoring agent is added and the mixture is homogenized by passing through a conventional homogenizer to obtain an emulsion suitable for oral administration to animals to relieve symptoms of pain or coughing. The composition can be administered in dosages of about 0.3 fluid ounce per dose.

I claim:

1. A method for alleviating tussive symptoms comprising administering to an animal an antitussive amount of a compound selected from the group consisting of trans (L)-3-(o-chlorophenyl) - 1,6 - dimethyl - 5 - phenyl-1,4,5,6-tetrahydro-as-triazine and the pharmacologically-acceptable salts thereof.

2. The method of claim 1 wherein the compound is trans(L) - 3-(o-chlorophenyl) - 1,6-dimethyl - 5-phenyl-1,4,5,6-tetrahydro-as-triazine hydrochloride.

3. The method of claim 1 wherein the compound is administered at a dosage rate from about 25 to about 100 milligrams per kilogram of animal body weight.

4. A method for alleviating symptoms of pain comprising administering to an animal an analgesic amount of a compound selected from the group consisting of trans(L) - 3 - (o - chlorophenyl) - 1,6 - dimethyl-5-phenyl-1,4,5,6-tetrahydro-as-triazine and the pharmacologically-acceptable salts thereof.

5. The method of claim 4 wherein the compound is trans(L) - 3-(o-chlorophenyl) - 1,6-dimethyl - 5-phenyl-1,4,5,6-tetrahydro-as-triazine hydrochloride.

6. The method of claim 4 wherein the compound is administered at a dosage rate from about 25 to about 200 milligrams per kilogram of animal body weight.

7. An analgesic and antitussive composition in dosage unit form comprising a non-toxic carrier and at least about 50 milligrams per unit of a compound selected from the group consisting of trans(L)-3-(o-chlorophenyl)-1,6-dimethyl - 5-phenyl - 1,4,5,6-tetrahydro-as-triazine and the pharmacologically-acceptable salts thereof.

8. The composition of claim 7 wherein the compound is trans(L) - 3-(o-chlorophenyl)-1,6-dimethyl - 5-phenyl-1,4,5,6-tetrahydroastriazine hydrochloride.

References Cited

Trepanier et al., J. Med. Chem., 9, 881–885. November 1966.

ALBERT T. MEYERS, Primary Examiner

S. J. FRIEDMAN, Assistant Examiner